US008260374B2

(12) United States Patent
Wang et al.

(10) Patent No.: US 8,260,374 B2
(45) Date of Patent: Sep. 4, 2012

(54) POWER SAVING OPERATION OF USER EQUIPMENT IN A CELLULAR COMMUNICATION SYSTEM

(75) Inventors: Xiaohui Wang, Lund (SE); Peter Kornevi, Lund (SE); Conor White, Bjärred (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 193 days.

(21) Appl. No.: 12/872,459

(22) Filed: Aug. 31, 2010

(65) Prior Publication Data

US 2012/0052887 A1 Mar. 1, 2012

(51) Int. Cl.
*H04M 1/00* (2006.01)
(52) U.S. Cl. .................. 455/574; 455/127.5; 455/343.1; 455/343.2
(58) Field of Classification Search ................. 455/13.4, 455/127.1, 127.5, 334, 343.1, 343.2, 572, 455/574, 550.1, 95, 466
See application file for complete search history.

(56) References Cited

U.S. PATENT DOCUMENTS

| | | | |
|---|---|---|---|
| 6,345,180 B1 | 2/2002 | Reichelt | |
| 6,560,453 B1 | 5/2003 | Henry, Jr. et al. | |
| 7,146,151 B2 * | 12/2006 | Arimitsu | 455/343.2 |
| 7,505,795 B1 | 3/2009 | Lim et al. | |
| 7,653,419 B2 * | 1/2010 | Nagasawa | 455/574 |
| 7,912,518 B2 * | 3/2011 | Uh et al. | 455/574 |
| 2005/0233780 A1 | 10/2005 | Jani et al. | |
| 2006/0281436 A1 * | 12/2006 | Kim et al. | 455/343.2 |
| 2007/0037610 A1 | 2/2007 | Logan | |
| 2007/0167195 A1 | 7/2007 | Su et al. | |
| 2007/0238438 A1 * | 10/2007 | Alon et al. | 455/343.2 |
| 2008/0178013 A1 | 7/2008 | Kim et al. | |
| 2008/0219196 A1 | 9/2008 | Ptasinski | |
| 2008/0225760 A1 | 9/2008 | Iyer et al. | |

FOREIGN PATENT DOCUMENTS

EP 2 096 840 A1 9/2009

OTHER PUBLICATIONS

PCT International Search Report, mailed Oct. 18, 2011, in connection with counterpart International Application No. PCT/EP2011/064868.
PCT Written Opinion, mailed Oct. 18, 2011, in connection with counterpart International Application No. PCT/EP2011/064868.

* cited by examiner

*Primary Examiner* — Cong Tran
(74) *Attorney, Agent, or Firm* — Potomac Patent Group PLLC

(57) ABSTRACT

Mobile User Equipment (UE) is operated in a first mode in which radio functions are enabled. In response to a predetermined condition, the UE is operated in a power saving mode involving disabling all radio functionality for a first period of time during which no connection is maintained with a cellular communication system serving node. After the first period of time, the UE ascertains whether any attempts were made to contact it during the first period of time and if so whether any of the attempted contacts is characterized by an attribute that matches a predefined attribute. If any of the attempted contacts is characterized by the attribute that matches the predefined attribute, then a user alarm is activated. If the response to the user alarm has been made, then the UE is again operated in the first mode; otherwise, the UE is again operated in the power saving mode.

30 Claims, 5 Drawing Sheets

POWER SAVING OPERATION OF USER EQUIPMENT IN A CELLULAR COMMUNICATION SYSTEM

BACKGROUND

The present invention relates to cellular communication systems, more particularly to user equipment in cellular communication system, and even more particularly to power saving operation of user equipment in a cellular communication system.

Cellular communication systems are well-known and are in wide-spread use around the world. FIG. 1 is a diagram illustrating a common feature found in most systems: a serving node 101 (depending on the system, it can be called a "base station", a Node B, an evolved Node B ("eNodeB" or "eNB")) serves user equipment (UE) 103 (e.g., a mobile terminal) that is located within the serving node's geographical area of service, called a "cell" 105. For convenience, the term "serving node" will be used henceforth throughout this document, but any such references are not intended to limit the scope of the invention to any one particular system. Thus, references to "serving node" are intended to also refer to "base stations", "Node B's", "eNodeB's", "eNB's", and also to any equivalent node in a cellular communication system.

Communication is bidirectional between the serving node 101 and the UE 103. Communications from the serving node 101 to the UE 103 are referred to as taking place in a "downlink" direction, whereas communications from the UE 103 to the serving node 101 are referred to as taking place in an "uplink" direction.

Traditionally, a UE uses a random access procedure to request a connection, and is paged when another entity wishes to establish communication with the UE. When there are no communications on-going, the UE conserves energy by entering an idle state and only waking up once every predefined discontinuous reception (DRX) cycle in order to check for a paging message.

With the ever spreading deployment of mobile broadband in combination with the ever-growing use of social networking, mobile communications have become more and more data oriented (as opposed to voice oriented). UE's are therefore frequently paged for data—rather than voice-related operations (e.g., receiving new comments from a friend, receiving push email) or they become active automatically in order to check for the presence of new messages on one or more web pages. In addition, popular smart phones also have other advanced applications, which consume a lot of electric and processing power.

The classical mobile network determined DRX mode of operation was designed primarily with voice communications in mind, and is not optimized to enable UEs to conserve energy in the context of these new data-oriented developments. Therefore, improved methods and apparatuses for dealing with idle mode are desirable.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in methods and apparatuses for operating a user equipment in a cellular communication system. Such operation involves operating the user equipment in a first mode in which radio functions are enabled; and in response to a predetermined condition, operating the user equipment in a power saving mode. The power saving mode comprises disabling all radio functionality for a first period of time, wherein no connection is maintained with a cellular communication system serving node during the first period of time. In response to detecting that the first period of time has elapsed, it is ascertained whether any attempts were made to contact the user equipment during the first period of time and if so whether any of the attempted contacts is characterized by an attribute that matches a predefined attribute. If it is ascertained that any of the attempted contacts is characterized by the attribute that matches the predefined attribute, then a user alarm is activated. If a response to the user alarm has been made, then the user equipment is again operated in the first mode. Otherwise, the user equipment is again operated in the power saving mode.

The predefined attribute can, for example and without limitation, be any one or more of the following: a telephone number of a voice caller or of a sender of a Short Message Service (SMS) message; a predefined text string in a Short Message Service (SMS) message; a predefined indicator of urgency.

In an aspect of some embodiments, the predetermined condition is assertion of a signal that signifies an interaction of a user with a user interface of the user equipment.

In an aspect of some embodiments, the predetermined condition is a detected level of user equipment activity being below a threshold activity level.

In an aspect of some embodiments, the predetermined condition is an occurrence of a predetermined moment in time.

In an aspect of some embodiments, the predetermined condition is the user equipment experiencing a radio environment whose quality is lower than a threshold quality level.

In an aspect of some embodiments, operation of the user equipment involves changing user equipment operation from the power saving mode to the first mode in response to detection of a signal that signifies an interaction of a user with a user interface of the user equipment.

In an aspect of some embodiments, ascertaining whether any attempt was made to contact the user equipment during the first period of time comprises using a radio functionality of the user equipment to receive information from a network node of the cellular communication system. The information received from the network node can, for example, include one or more attributes of any attempts to contact the user equipment during the first period of time.

In an aspect of some embodiments, operation of the user equipment involves responding to ascertaining that an attempt was made to contact the user equipment during the first period of time by accessing voice mail contents associated with the attempt to contact the user equipment during the first period of time and processing the voice mail contents to ascertain whether the voice mail contents are characterized by the attribute that matches the predefined attribute.

In an aspect of some embodiments, operation of the user equipment involves responding to ascertaining that an attempt was made to contact the user equipment during the first period of time by performing accessing a web page on the World Wide Web, wherein the web page is associated with the attempt to contact the user equipment during the first period of time; and processing the web page contents to ascertain whether the voice mail contents are characterized by the attribute that matches the predefined attribute.

In an aspect of some embodiments, operation of the user equipment involves adjusting a length of the first period of time as a function of an ascertained battery capacity of the user equipment.

In an aspect of some embodiments, operation of the user equipment involves turning off the user alarm and causing the user alarm to again be made after a second period of time if the response to the user alarm has not been made.

BRIEF DESCRIPTION OF THE DRAWINGS

The objects and advantages of the invention will be understood by reading the following detailed description in conjunction with the drawings in which.

DETAILED DESCRIPTION

Figure 1:
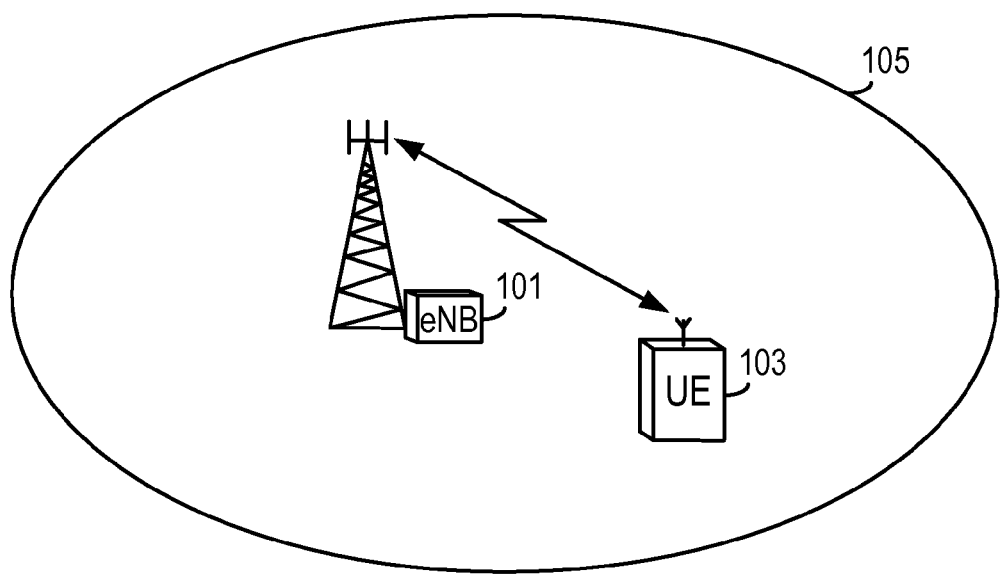
FIG. 1 is a diagram illustrating a communication system having a serving node that serves a user equipment within its area of service (cell).

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., analog and/or discrete logic gates interconnected to perform a specialized function), by one or more processors programmed with a suitable set of instructions, or by a combination of both. The term "circuitry configured to" perform one or more described actions is used herein to refer to any such embodiment (i.e., one or more specialized circuits and/or one or more programmed processors). Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments as described above may be referred to herein as "logic configured to" perform a described action, or alternatively as "logic that" performs a described action.

In aspects of embodiments consistent with the invention, new types of power saving states are introduced that are adaptive to operational situations that modern UEs are likely to find themselves in. These power saving states can be invoked manually and/or automatically.

For example, an aspect of embodiments consistent with the invention involves a mode of operation herein called "discontinuous connection" (DCX) mode, in which a UE saves energy by turning off, for example, radio components and thereby becoming virtually disconnected from the network. The UE reconnects with the network only if an event deemed important enough has occurred, but otherwise remains disconnected even if other events (possibly including outside attempts to communicate with the UE) have occurred.

One exemplary embodiment involves enabling the DCX mode for a UE in response to ascertaining that the UE is exhibiting low active conditions. The UE in this exemplary embodiment accordingly turns off its radio periodically for a sufficiently long time determined by the UE (as opposed to being determined by the network), and turns on the connections to the mobile network between the off-state periods. During the off-state, only necessary programs such as timers are active, while in the on-state the UE can perform other applications in addition to the standard tasks for network signaling such as running cell update or paging.

It is recognized that the UE will likely miss messages that were first presented when the UE was in the off-state. In order to trace these missed messages, the UE can analyze the numbers of the voice callers or Short Message Service (SMS) senders (the information about such voice callers or SMS senders being provided by a network node. If the numbers are found among a list of pre-defined numbers deemed to represent important communication, the UE responds by turning on one or more alarms that alert the user of the UE to the existence of a possibly important message or call.

In another aspect of some embodiments, if the user does not answer the alarm, the alarm can be turned off and then again activated periodically.

In yet another aspect of some embodiments, the periods in-between alarm activations can be modified adaptively by the UEs with incrementally longer times or in terms of the battery status.

In still another aspect of some embodiments, when an SMS message has been received, the UE can run an application to check the SMS message contents. If pre-defined contents are found (indicating that the SMS message contains something important to the user), the UE turns on the alarm(s) as described before.

In yet another aspect of some embodiments, other applications can be run during the on-state. For instance, the mobiles can download the contents of voice mail or go to pre-defined web pages to check the contents. The same alarm process can be applied here as well if the voice mail and/or web page contents are found to be urgent (i.e., some aspect of the contents match one or more entries in a pre-defined list) by the programs in the UE.

In still another aspect of some embodiments, the DCX period can be extended automatically if it is ascertained by UE circuitry that the battery capacity is below a pre-defined threshold level.

In yet another aspect of some embodiments, the DCX mode can be enabled manually (e.g., before a long journey or meeting) and/or automatically (e.g., during bed time or during bad radio conditions).

These and other aspects will now be described in further detail.

Figure 2:
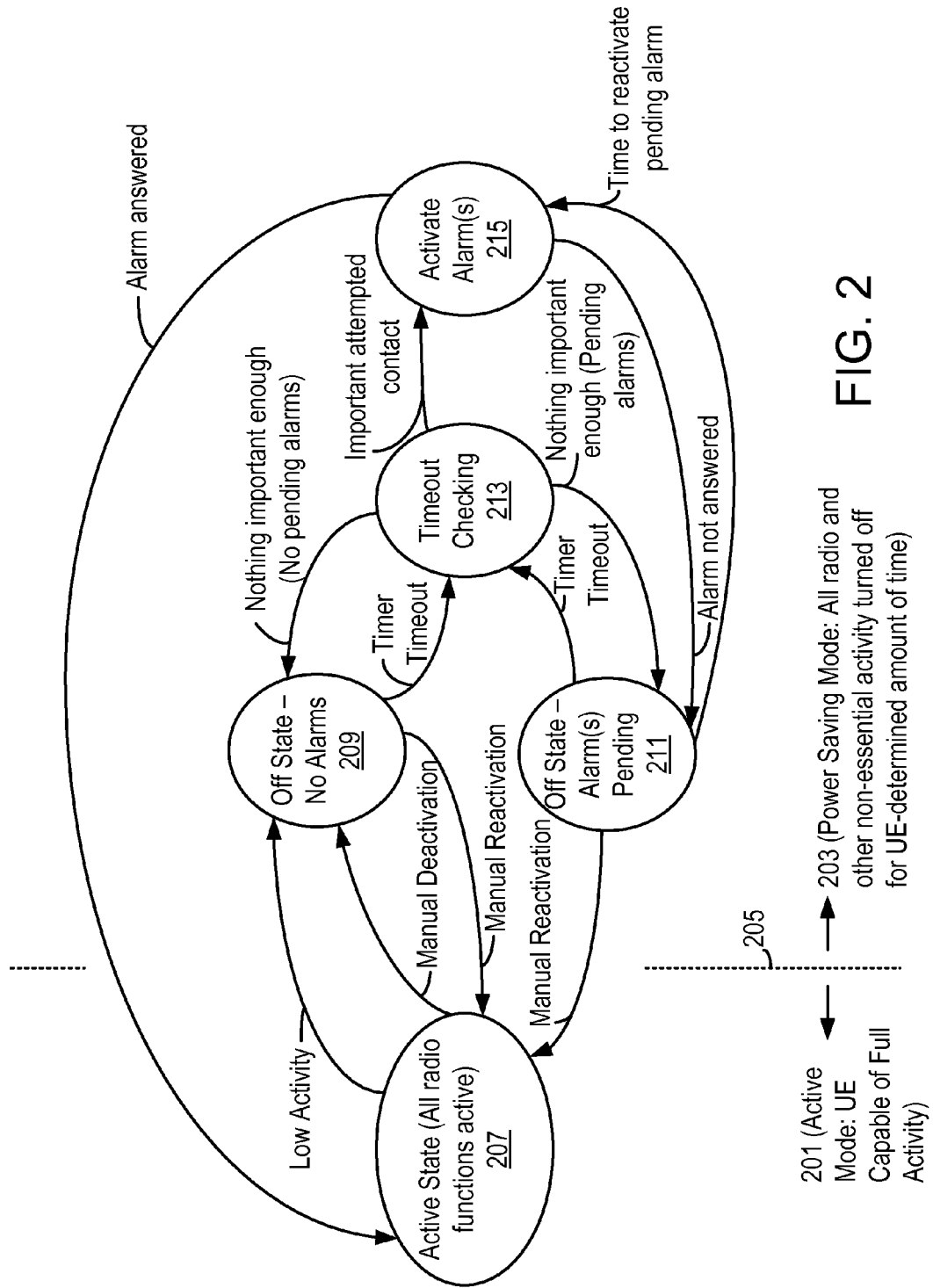
FIG. 2 is a state diagram of an exemplary embodiment in accordance with aspects of the invention.

FIG. 2 is a state diagram of an exemplary embodiment in accordance with aspects of the invention. A UE's state can be broadly categorized as being either in an "active mode" 201 (illustrated by states to the left of the vertical dotted line 205) or in a "Power Saving Mode" 203 (illustrated by states to the right of the vertical dotted line 205). In the exemplary embodiment, the active mode 201 comprises an active state 207, in which all radio and other functions are active (or capable of being immediately activated, e.g., in the case of user-invokable applications).

The power saving mode 203 comprises a number of states. In this exemplary embodiment, these are:

Off State—No Alarms 209: In this state, all radio functionality is turned off to conserve power, and only essential functions (e.g., timer functionality, maintaining memory and other UE states—i.e., those functions that if not performed would cause the UE to cease functioning properly) are performed. In some alternative embodiments, local applications, such as a pedestrian step-counter for use while hiking can be enabled by the user and kept active while in Off State—No Alarms 209. An attribute of this state is that there are no alarms pending that will later have to be activated to alert the user about the existence of an important communication that was received while the UE was in the power saving mode 203.

Off State—Alarms Pending 211: In this state, all radio functionality is turned off to conserve power, and only essential functions (e.g., timer functionality, maintaining memory and other UE states—i.e., those functions that if not performed would cause the UE to cease functioning properly) are performed. In some alternative embodiments, local applications, such as a pedestrian step-counter for use while hiking can be enabled by the user and kept active while in Off State—Alarms Pending 211. An attribute of this state is that there is at least one alarm pending that will later have to be activated to alert the user about the existence of an important communication that was received while the UE was in the power saving mode 203.

Timeout Checking State 213: In this state, the UE activates sufficient radio functionality to obtain information from the serving node that informs about any attempted contacts (e.g., voice calls, voicemail messages, SMS messages, changed information at one or more pre-defined web sites) that were made while the UE was in power saving mode 203. The radio functionality is deactivated upon receiving the information, and the information is then analyzed to ascertain whether any of the attempted contacts/information is "important enough" to immediately try to inform the user of the UE about. Whether information is "important enough" can be determined by, for example, comparing one or more attributes of the information (e.g., a caller's telephone number; at least a portion of a text string in an SMS message) with a list of such attributes that have been pre-stored in a look-up table. A match with any entry indicates that the information is "important enough".

Activate Alarm(s) State 215: In this state, one or more output devices of the UE (e.g., audio, video, tactile (e.g., vibration)) are activated for at least a limited period of time to alert the UE's user to the existence of one or more attempted contacts/information that was ascertained to be important enough to warrant immediate attention.

In this exemplary embodiment, transitioning from one state to another occurs as follows: When the user turns on the UE, it will operate in Active State 207 for some period of time, and possibly indefinitely depending on how the UE is used. However, if UE circuitry (e.g., a processor running a portion of program code, or a timeout signal activated by hardware timer circuit) determines that the UE is engaged in very low activity (i.e., a measure of the UE's activity is below some threshold level, the threshold being either pre-defined and/or dynamically altered based on, for example, the level of battery reserves), then the UE transitions to the Off State No Alarms 209. In this exemplary embodiment, the user can, by means of a UE interface (i.e., Input/Output (I/O) device), manually cause ("Manual Deactivation") the UE to transition into the Off State—No Alarms 209.

Entry into Off State—No Alarms 209 causes a power saving mode timer to be set to a predefined value. In some but not necessarily all embodiments, the timer value is predefined at the time of entering into Off State—No Alarms 209; however, the predefined timer value itself can be made to vary over time as a function of, for example, what the user of the UE is anticipated to do. As explained above, all radio functionality is deactivated and only the most essential functions are performed while the UE is in Off State—No Alarms 209. At some point in time, the power saving mode timer times out, and this causes the UE to transition to Timeout Checking State 213. If the UE in Timeout Checking State 213 ascertains that there were no attempted contacts/information while the UE was in power saving mode 203 that were important enough to warrant immediate attention and there are no pending alarms from a previous check for important information ("Nothing important enough—No pending alarms"), then the UE returns to Off State—No Alarms 209.

However, if the UE in Timeout Checking State 213 ascertains that there was at least one attempted contact/information while the UE was in power saving mode 203 that was important enough to warrant immediate attention by the UE's user ("Important attempted contact"), then the UE transitions to Activate Alarm(s) state 215. If the user of the UE responds to the alarm (e.g., by means of one or more of the UE's I/O devices) ("Alarm answered"), the UE transitions back to Active State, so that the user can operate the UE as appropriate to respond to the alarm.

In some embodiments, the alarm can be left in an activated state indefinitely. However, in the exemplary embodiment the alarm's activation period is limited to some predetermined amount of time. If the user does not respond to the alarm within this period of time ("Alarm not answered"), the alarm is deactivated and the UE transitions to the Off State—Alarm(s) Pending state 211. Upon entry to the Off State—Alarms Pending state 211, two timers are initialized/set to respective predetermined periods of time: one is the power saving mode timer (same time as is used in Off State—No Alarms 209); another is an alarm timer. Upon expiration of the alarm timer ("Time to reactivate pending alarm"), the UE transitions to the Activate Alarms(s) state 215 to again try to alert the user to the existence of an attempted contact/information that was ascertained to be important enough to warrant immediate attention. Transitions out of the Activate Alarm(s) state 215 are as described above.

Another transition out of Off State—Alarm(s) Pending 211 can occur when the power saving mode timer expires. In response to this particular timeout ("Timer Timeout") the UE transitions to Timeout Checking state 213. As described above, if the UE in Timeout Checking State 213 ascertains that there was at least one attempted contact/information while the UE was in power saving mode 203 that was important enough to warrant immediate attention by the UE's user ("Important attempted contact"), then the UE transitions to Activate Alarm(s) state 215. However, if the UE ascertains that there were no new attempted contacts/information while the UE was in power saving mode 203 that were important enough to warrant immediate attention by the UE's user, then the UE recognizes that there is still at least one alarm pending from an earlier time ("Nothing important enough (Pending alarms)") and therefore transitions back to Off State—Alarm(s) Pending 211.

Further in this exemplary embodiment, while in either of the Off State—No Alarms 209 or the Off State—Alarm(s) Pending 211, the user can manually reactivate the UE ("Manual Reactivation") by means of interaction with one or more of the UE's I/O devices, and this causes the UE to transition back to the Active State (All radio functions active) 207.

Aspects of exemplary embodiments in accordance with the invention related to power saving mode 203 are now described in connection with FIGS. 3a and 3b which, in one respect, together depict processes/steps performed by a UE while in power saving mode 203. In another respect, FIGS. 3a and 3b together comprise a block diagram of a UE 300 that comprises various means and their inter-relationship for performing the illustrated functions related to power saving mode 203.

Figure 3A:
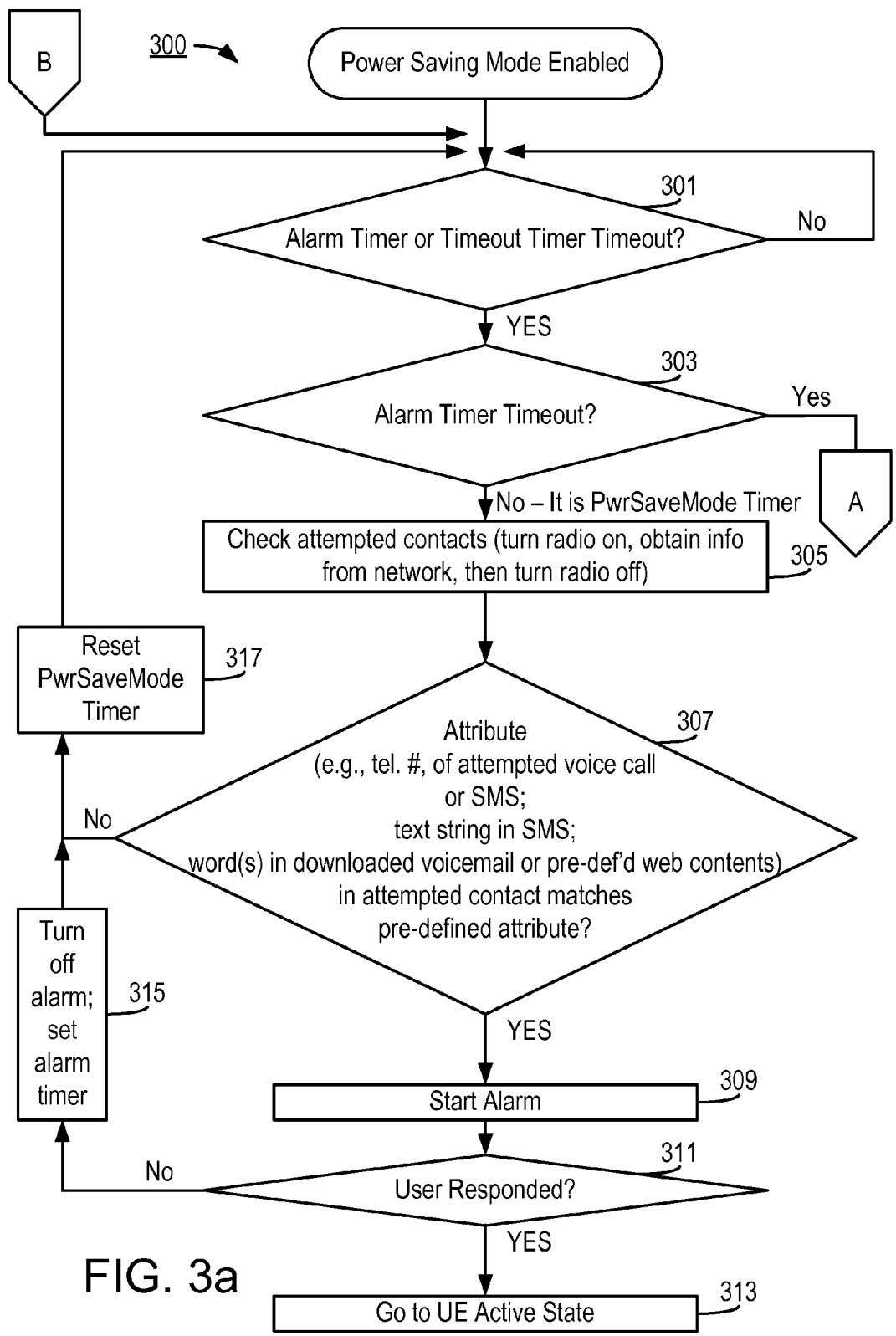
FIGS. 3a and 3b in one respect, together depict processes/steps performed by a UE while in a power saving mode in accordance with aspects of the invention.
Figure 3B:
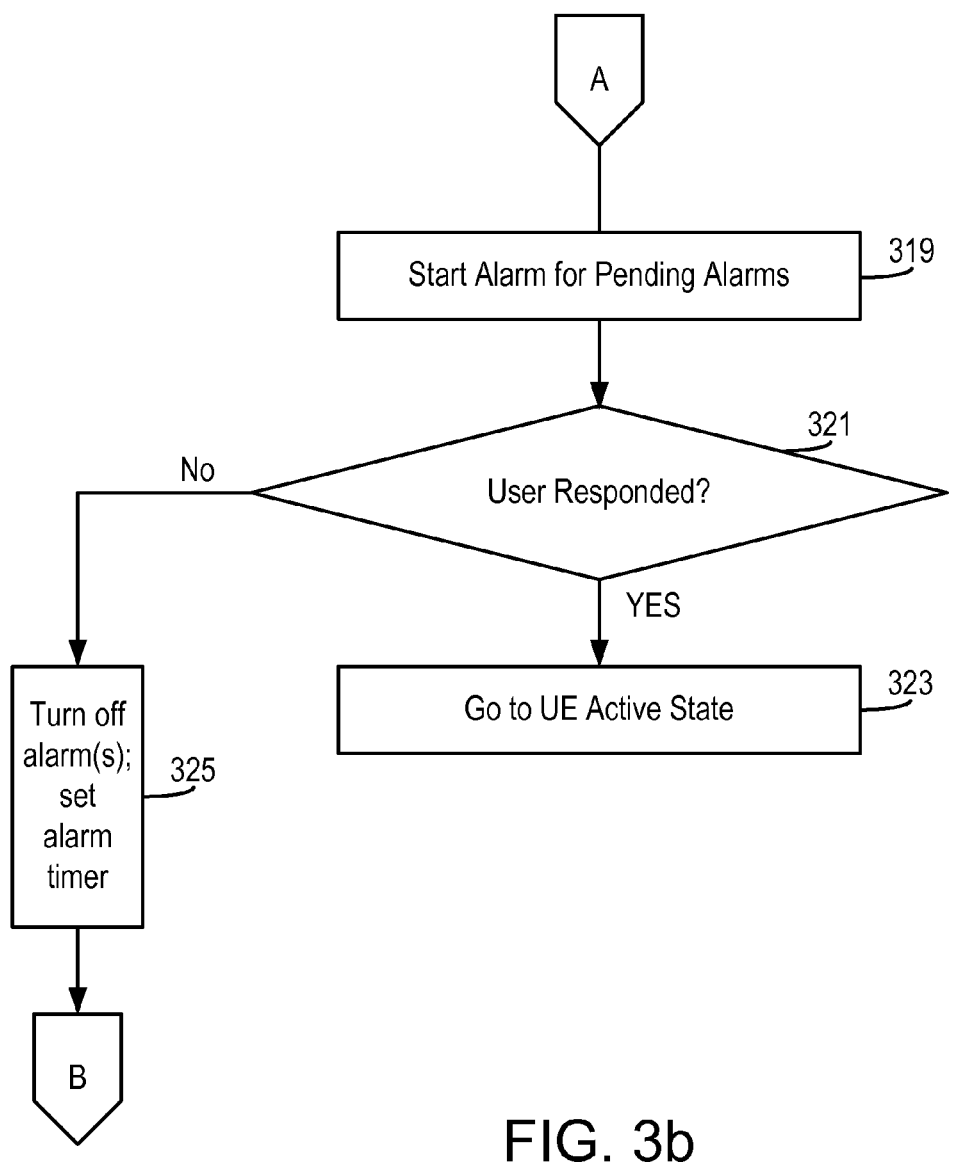

The embodiments described by FIGS. 3a and 3b start with the assumption that the UE is either in Off State—No Alarms 209 or Off State—Alarm(s) Pending 211. This means that all radio functionality has been disabled and only the most essential functions are permitted to be performed. An aspect of power saving mode therefore includes the UE ascertaining whether either of the power saving mode or alarm timers have timed out (decision block 301). If not ("No" path out of decision block 301), no other actions are taken, and no state transitions take place.

If a timer has timed out ("Yes" path out of decision block 301), the UE ascertains whether it was the alarm timer that timed out (decision block 303). If it is not the alarm timer ("No" path out of decision block 301) it can be concluded in this embodiment that the timeout was caused by the power saving mode timer. The UE therefore responds by ascertaining whether any entity attempted to contact the UE while it was in power saving mode 203 since the last check for such attempted contacts (step 305). This involves turning on sufficient radio functionality to obtain this information from the network (e.g., from the serving node), and then turning off the radio functionality.

Attributes of the received information (e.g., telephone numbers of callers or SMS message senders, voice mail information and/or content, SMS message content; a predefined indicator of urgency) are compared against entries stored in a look-up table or other storage means to ascertain whether there is a match (decision block 307). If there is a match ("Yes" path out of 307) then the UE activates one or more alarms (step 309) to alert the user to the existence of an attempted contact that is considered important enough to notify him or her. The alarm(s) can be generated by any one or more of a number of user interface devices, such as but not limited to audio, video, and tactile (e.g., vibration) devices.

The UE ascertains whether the user responded to the alarm(s) (decision block 311). The response can be made by means of any of a number of user interface devices, such as but not limited to switches (e.g., buttons on the UE), tactile (e.g., touch screen), and acoustic sensor (e.g., microphone). The test to ascertain whether the user responded to the alarm(s) should be made a sufficiently long time after activation of the alarm to permit the user time to perceive the alarm and react to it.

If the user responded to the alarm(s) ("Yes" path out of decision block 311), then the UE transitions to the Active State 207 (step 313) in which all radio and other UE functionality is at least enabled, if not activated, so that the user can operate the UE to take suitable actions in response to the alarm. Operation and functionality of a UE in Active State is well known in the art, and therefore need not be described herein in further detail.

Returning to decision block 311, if the user did not respond to the alarm(s) within the allotted amount of time ("No" path out of decision block 311), the alarm(s) is/are deactivated and an alarm timer is set so that it will timeout after a predetermined amount of time (step 315). Then, the power saving mode timer is reset (step 317) and the UE returns to one of the Off states in which only the most essential functions are performed and the UE again waits for one of the timers to expire (decision block 301).

Returning to decision block 303, if the UE ascertains that the alarm timer expired ("Yes" path out of decision block 303), it responds by activating one or more alarms (step 319) to alert the user to the existence of an attempted contact that is considered important enough to notify him or her. The alarm(s) can be generated by any one or more of a number of user interface devices, such as but not limited to audio, video, and tactile (e.g., vibration) devices.

The UE ascertains whether the user responded to the alarm(s) (decision block 321). The response can be made by means of any of a number of user interface devices, such as but not limited to switches (e.g., buttons on the UE), tactile (e.g., touch screen), and acoustic sensor (e.g., microphone). The test to ascertain whether the user responded to the alarm(s) should be made a sufficiently long time after activation of the alarm to permit the user time to perceive the alarm and react to it.

If the user responded to the alarm(s) ("Yes" path out of decision block 321), then the UE transitions to the Active State 207 (step 323) in which all radio and other UE functionality is at least enabled, if not activated, so that the user can operate the UE to take suitable actions in response to the alarm.

Returning to decision block 321, if the user did not respond to the alarm(s) within the allotted amount of time ("No" path out of decision block 321), the alarm(s) is/are deactivated and an alarm timer is set so that it will timeout after a predetermined amount of time (step 325). Then, the UE returns to one of the Off states in which only the most essential functions are performed and the UE again waits for one of the timers to expire (decision block 301).

Not illustrated in FIGS. 3a-3b, but also present in some embodiments, is a test to see whether the user of the UE has manually interacted with one or more I/O components of the UE in a predefined way that causes the UE to leave the power saving mode 205 and to return to the active mode 203.

Figure 4:
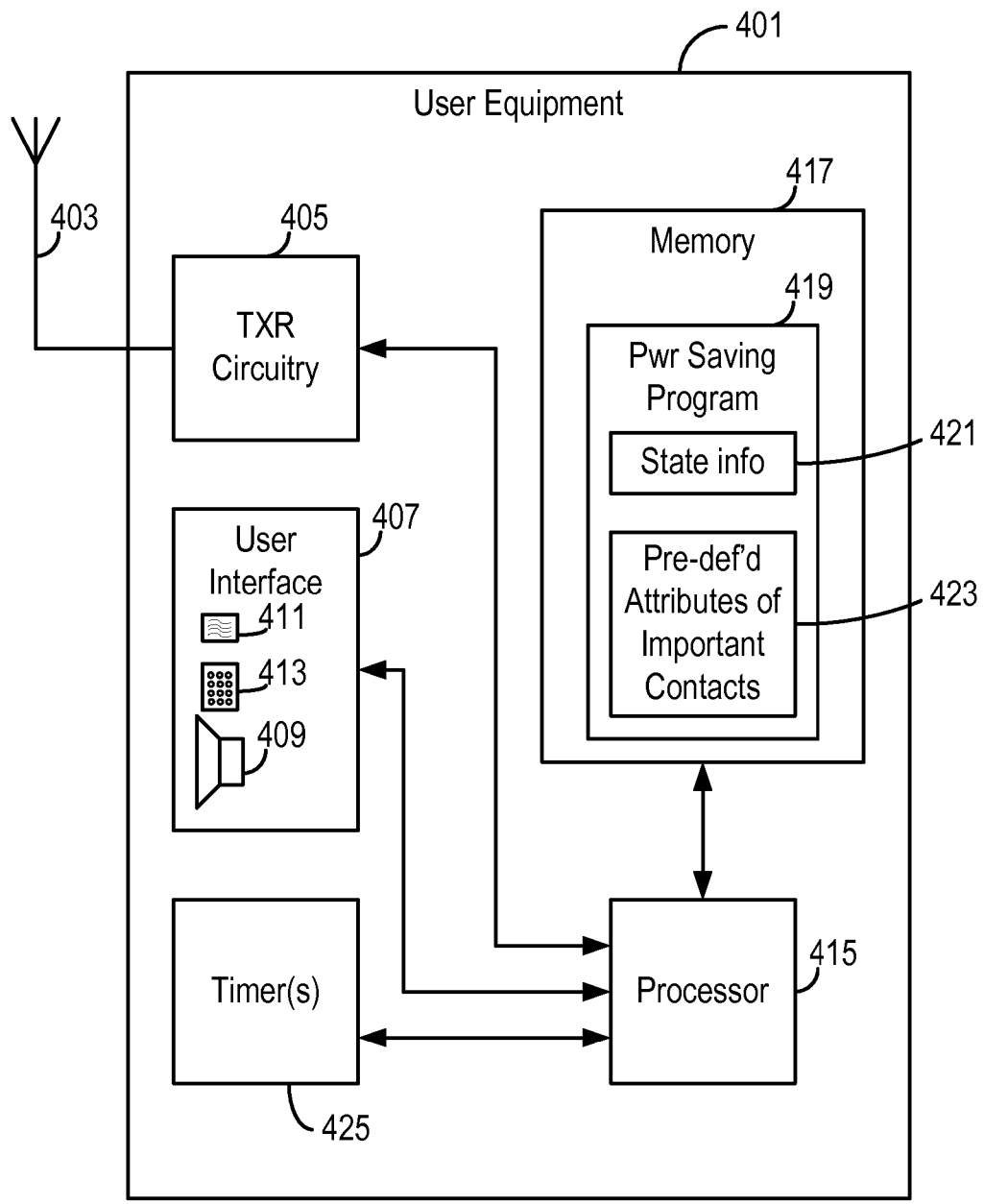
FIG. 4 is a block diagram of one of many possible exemplary embodiments of a UE 401 consistent with the invention.

FIG. 4 is a block diagram of one of many possible exemplary embodiments of a UE 401 consistent with the invention. To facilitate the reader's understanding of the various aspects of the invention, only that circuitry that is meaningfully related to one or more aspects of the invention are shown. Those of ordinary skill in the art will readily appreciate that a UE also includes many other types of circuitry and/or functional components.

The UE 401 includes at least one antenna 403 to interact with an air interface for transmitting and receiving radiofrequency signals. The UE further includes transceiver circuitry 405 for performing transmission and reception functions.

The UE 401 further includes a User Interface 407 that can include any one or more of a number of different types of input/output equipment, such as but not limited to an audio output device (speaker), a visual display 411, and a set of switches (push buttons) 413.

In this exemplary embodiment, the UE 401 is controlled by a programmable processor 415. A processor readable storage medium (memory device) 417 is also provided that stores a set of program instructions 419 that when executed by the processor 415 cause the UE 401 to carry out the DCX mode functionality. In support of this functionality, UE state information 421 and the look-up table (or equivalent) of predefined attributes of important contacts 423 are also stored in the memory 419. The UE state information 421 and look-up table of pre-defined attributes of important contacts 423 can be considered to be part of the set of program instructions 419 as illustrated, but this is not an essential aspect of the invention. In alternative embodiments, one or both of these features can be stored separately from the set of program instructions 419.

To further support the DCX mode functionality, the UE includes one or more timers 425. The processor, when carrying out the set of program instructions 419 operates the various UE components to carry out functionality such as that illustrated and described with respect to FIGS. 2 and 3a-3b.

The various embodiments that are in accordance with the invention enable UEs to conserve energy by providing a power saving mode in which the UE stays unless an attempt is made to contact the user equipment, wherein the attempted contact is characterized by an attribute that matches a predefined attribute. In this way, the UE can be selective about which attempted contacts are important enough to warrant exiting the power saving mode. Further, in another aspect of some embodiments, the UE does not automatically exit the power saving mode if the attempted contact is "important enough", but rather activates an alarm and only exits the power saving mode if a user of the UE responds to the alarm. In some but not necessarily all embodiments, the UE can also exit the power saving mode based on a manually asserted signal from a user of the UE even without any attempted contact having been made.

The invention has been described with reference to particular embodiments. However, it will be readily apparent to those skilled in the art that it is possible to embody the invention in specific forms other than those of the embodiment described above. The described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of operating a user equipment in a cellular communication system, the method comprising:
   operating the user equipment in a first mode in which radio functions are enabled; and
   in response to a predetermined condition, operating the user equipment in a power saving mode, wherein the power saving mode comprises:
      disabling all radio functionality for a first period of time, wherein no connection is maintained with a cellular communication system serving node during the first period of time;
      detecting that the first period of time has elapsed and in response to said detection, ascertaining whether any attempts were made to contact the user equipment during the first period of time and if so whether any of the attempted contacts is characterized by an attribute that matches a predefined attribute;
      if it is ascertained that any of the attempted contacts is characterized by the attribute that matches the predefined attribute, then activating a user alarm;
      ascertaining whether a response to the user alarm has been made;
      if the response to the user alarm has been made, then again operating the user equipment in the first mode; and
      if the response to the user alarm has not been made, then again operating the user equipment in the power saving mode.

2. The method of claim 1, wherein the predefined attribute is a telephone number of a voice caller or of a sender of a Short Message Service (SMS) message.

3. The method of claim 1, wherein the predefined attribute is a predefined text string in a Short Message Service (SMS) message.

4. The method of claim 1, wherein the predefined attribute is a predefined indicator of urgency.

5. The method of claim 1, wherein the predetermined condition is assertion of a signal that signifies an interaction of a user with a user interface of the user equipment.

6. The method of claim 1, wherein the predetermined condition is a detected level of user equipment activity being below a threshold activity level.

7. The method of claim 1, wherein the predetermined condition is an occurrence of a predetermined moment in time.

8. The method of claim 1, wherein the predetermined condition is the user equipment experiencing a radio environment whose quality is lower than a threshold quality level.

9. The method of claim 1, further comprising:
   changing user equipment operation from the power saving mode to the first mode in response to detection of a signal that signifies an interaction of a user with a user interface of the user equipment.

10. The method of claim 1, wherein ascertaining whether any attempt was made to contact the user equipment during the first period of time comprises using a radio functionality of the user equipment to receive information from a network node of the cellular communication system.

11. The method of claim 10, wherein the information received from the network node includes one or more attributes of any attempts to contact the user equipment during the first period of time.

12. The method of claim 1, comprising:
   in response to ascertaining that an attempt was made to contact the user equipment during the first period of time, accessing voice mail contents associated with the attempt to contact the user equipment during the first period of time and processing the voice mail contents to ascertain whether the voice mail contents are characterized by the attribute that matches the predefined attribute.

13. The method of claim 1, comprising:
   in response to ascertaining that an attempt was made to contact the user equipment during the first period of time performing:
   accessing a web page on the World Wide Web, wherein the web page is associated with the attempt to contact the user equipment during the first period of time; and
   processing the web page contents to ascertain whether the voice mail contents are characterized by the attribute that matches the predefined attribute.

14. The method of claim 1, comprising:
   adjusting a length of the first period of time as a function of an ascertained battery capacity of the user equipment.

15. The method of claim 1, comprising:
   if the response to the user alarm has not been made, then turning off the user alarm and causing the user alarm to again be made after a second period of time.

16. An apparatus for operating a user equipment in a cellular communication system, the apparatus comprising:
   circuitry configured to operate the user equipment in a first mode in which radio functions are enabled; and
   circuitry configured to operate the user equipment in a power saving mode in response to a predetermined condition, wherein the power saving mode comprises:

disabling all radio functionality for a first period of time, wherein no connection is maintained with a cellular communication system serving node during the first period of time;

detecting that the first period of time has elapsed and in response to said detection, ascertaining whether any attempts were made to contact the user equipment during the first period of time and if so whether any of the attempted contacts is characterized by an attribute that matches a predefined attribute;

if it is ascertained that any of the attempted contacts is characterized by the attribute that matches the predefined attribute, then activating a user alarm;

ascertaining whether a response to the user alarm has been made;

if the response to the user alarm has been made, then again operating the user equipment in the first mode; and if the response to the user alarm has not been made, then again operating the user equipment in the power saving mode.

17. The apparatus of claim 16, wherein the predefined attribute is a telephone number of a voice caller or of a sender of a Short Message Service (SMS) message.

18. The apparatus of claim 16, wherein the predefined attribute is a predefined text string in a Short Message Service (SMS) message.

19. The apparatus of claim 16, wherein the predefined attribute is a predefined indicator of urgency.

20. The apparatus of claim 16, wherein the predetermined condition is assertion of a signal that signifies an interaction of a user with a user interface of the user equipment.

21. The apparatus of claim 16, wherein the predetermined condition is a detected level of user equipment activity being below a threshold activity level.

22. The apparatus of claim 16, wherein the predetermined condition is an occurrence of a predetermined moment in time.

23. The apparatus of claim 16, wherein the predetermined condition is the user equipment experiencing a radio environment whose quality is lower than a threshold quality level.

24. The apparatus of claim 16, further comprising:
circuitry configured to change user equipment operation from the power saving mode to the first mode in response to detection of a signal that signifies an interaction of a user with a user interface of the user equipment.

25. The apparatus of claim 16, wherein the circuitry configured to ascertain whether any attempt was made to contact the user equipment during the first period of time comprises circuitry configured to use a radio functionality of the user equipment to receive information from a network node of the cellular communication system.

26. The apparatus of claim 25, wherein the information received from the network node includes one or more attributes of any attempts to contact the user equipment during the first period of time.

27. The apparatus of claim 16, comprising:
circuitry configured to respond to an ascertaining that an attempt was made to contact the user equipment during the first period of time by accessing voice mail contents associated with the attempt to contact the user equipment during the first period of time and processing the voice mail contents to ascertain whether the voice mail contents are characterized by the attribute that matches the predefined attribute.

28. The apparatus of claim 16, comprising:
circuitry configured to respond to an ascertaining that an attempt was made to contact the user equipment during the first period of time by performing:
accessing a web page on the World Wide Web, wherein the web page is associated with the attempt to contact the user equipment during the first period of time; and
processing the web page contents to ascertain whether the voice mail contents are characterized by the attribute that matches the predefined attribute.

29. The apparatus of claim 16, comprising:
circuitry configured to adjust a length of the first period of time as a function of an ascertained battery capacity of the user equipment.

30. The apparatus of claim 16, comprising:
circuitry configured to turn off the user alarm and cause the user alarm to again be made after a second period of time if the response to the user alarm has not been made.

* * * * *